US009732589B1

(12) United States Patent
Hajiaghajani et al.

(10) Patent No.: US 9,732,589 B1
(45) Date of Patent: Aug. 15, 2017

(54) INTEGRATED SUBSEA POWER DISTRIBUTION SYSTEM WITH FLOWLINE DIRECT ELECTRICAL HEATING AND PRESSURE BOOSTING AND METHODS FOR USING

(71) Applicant: Chevron U.S.A. Inc., San Ramon, CA (US)

(72) Inventors: Masoud Hajiaghajani, Houston, TX (US); Daniel H. Broussard, Houston, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 15/270,376

(22) Filed: Sep. 20, 2016

(51) Int. Cl.

| | |
|---|---|
| ***E21B 36/04*** | (2006.01) |
| ***E21B 43/24*** | (2006.01) |
| ***E21B 47/06*** | (2012.01) |
| ***E21B 17/01*** | (2006.01) |
| ***H02G 9/00*** | (2006.01) |
| ***H05B 1/02*** | (2006.01) |

(52) U.S. Cl.
CPC .............. *E21B 36/04* (2013.01); *E21B 17/01* (2013.01); *E21B 43/2401* (2013.01); *E21B 47/06* (2013.01); *E21B 47/065* (2013.01); *H02G 9/00* (2013.01); *H05B 1/0244* (2013.01); *H05B 2214/03* (2013.01)

(58) Field of Classification Search
CPC ...... E21B 17/01; E21B 36/04; E21B 43/2401; E21B 43/128; E21B 47/06; E21B 47/065; H02G 9/00; H05B 1/0244; H05B 2214/03
See application file for complete search history.

(56) References Cited

U.S. PATENT DOCUMENTS 6,260,615 B1 * 7/2001 Dalrymple .............. E21B 36/04 166/302
6,318,467 B1 * 11/2001 Liu ........................ E21B 36/04 166/302

(Continued)

OTHER PUBLICATIONS

Hazel, Terence, et al.; "Impact of Subsea Processing Power Distribution: Subsea Switchgear Module—A Key Enabling Component in Subsea Installations"; OTC 20468, May 2010, pp. 1-13.

(Continued)

*Primary Examiner* — Matthew R Buck
(74) *Attorney, Agent, or Firm* — Karen R. DiDomenicis

(57) ABSTRACT

Disclosed is a system and method for integrating power distribution for subsea boosting and direct electrical heating (DEH) of at least one subsea flowline. A subsea power cable located in a subsea environment is electrically connected to at least one power generator at a topsides location and delivers power to a subsea switchgear module which connects to subsea adjustable speed drives (ASD). At least one pump motor is electrically connected to at least one of the ASD, and at least one capacitor bank is electrically connected to at least one of the subsea ASD. A subsea pressure boosting pump is driven by the pump motor. At least one capacitor bank is electrically connected to at least one of the subsea ASD. At least one DEH is electrically connected to at least one of the subsea ASD in series with the at least one capacitor bank and in contact with the at least one subsea flowline. Power is distributed to the boosting and DEH equipment more efficiently and cost effectively.

25 Claims, 3 Drawing Sheets

(56) References Cited

U.S. PATENT DOCUMENTS

| | | | | |
|---|---|---|---|---|
| 6,617,556 | B1 * | 9/2003 | Wedel | E21B 43/01<br>137/341 |
| 7,880,419 | B2 * | 2/2011 | Sihler | H02M 3/158<br>318/504 |
| 7,992,632 | B2 * | 8/2011 | Bornes | E21B 43/01<br>166/272.1 |
| 8,327,942 | B2 * | 12/2012 | Grimseth | E21B 43/01<br>166/272.1 |
| 9,537,428 | B2 * | 1/2017 | Hytten | H02J 3/36 |
| 2009/0200035 | A1 * | 8/2009 | Bjerkreim | E21B 43/01<br>166/335 |
| 2009/0226262 | A1 * | 9/2009 | Karstad | B63G 8/08<br>405/191 |
| 2009/0284901 | A1 * | 11/2009 | Sletten | E21B 33/0355<br>361/618 |
| 2015/0016812 | A1 * | 1/2015 | Radan | E21B 36/04<br>392/478 |
| 2015/0159797 | A1 * | 6/2015 | Baker | F16L 53/007<br>138/33 |

OTHER PUBLICATIONS

Nysveen, Arne, et al.; "Direct Electrical Heating of Subsea Pipelines—Technology Development and Operating Experience"; IEEE Transactions on Industry Applications, vol. 43, No. 1, Jan./Feb. 2007, pp. 118-129.

Roth, Rebecca Fisher; "Direct Electrical Heating of Flowlines—Guide to Uses and Benefits"; OTC 22631, Oct. 2011, pp. 1-16.

* cited by examiner

INTEGRATED SUBSEA POWER DISTRIBUTION SYSTEM WITH FLOWLINE DIRECT ELECTRICAL HEATING AND PRESSURE BOOSTING AND METHODS FOR USING

FIELD

The present disclosure relates to the field of power distribution for use in a subsea environment, particularly for use in oil and gas production facilities. The present disclosure further relates to the provision of both direct electrical heating and pressure boosting in subsea oil and gas flowline systems.

BACKGROUND

In the field of offshore oil and gas production, various technologies have been developed to provide flow assurance, i.e., enabling flow of hydrocarbon containing produced fluids in flowlines, also referred to as pipelines.

Among such technologies, direct electrical heating (DEH) technology has been applied to flowlines to provide flow assurance by preventing wax buildup and hydrate formation within flowlines. DEH technology can be especially useful to enable long subsea tiebacks to host facilities, i.e., long lengths of flowline used to connect a subsea drill center to a production facility. The production facility can be a surface facility on a platform or vessel, a shallow water facility or even an onshore facility. Alternating current can be transmitted via DEH cables, and can be returned to the surface production facility through the flowline walls. As a result of the electrical resistance in the flowline walls, heat is generated.

Subsea boosting is another technology that has been applied to offshore oil and gas production to provide flow assurance in subsea flowline systems including long subsea tiebacks. Pumps located on the seabed reduce back pressure on a reservoir to ensure an acceptable flow rate. Subsea boosting has known advantages in deep water, long distance tiebacks and multiple drill centers tied into a host facility.

The use of such technologies requires power to be delivered to multiple pieces of subsea equipment. There exists a need for systems and methods that integrate subsea power distribution to multiple subsea power users, i.e., subsea boosting and direct electrical heating, resulting in greater system efficiency and reduction in costs while providing flow assurance in a subsea flowline system.

SUMMARY

In one aspect, a method is provided for integrating power distribution for subsea boosting and direct electrical heating of at least one subsea flowline. The method includes delivering power through a subsea power cable located in a subsea environment from at least one power generator at a topsides location to a subsea switchgear module, delivering power to a plurality of subsea adjustable speed drives electrically connected to the subsea switchgear module, delivering power to at least one subsea pressure boosting pump electrically connected to a pump motor connected to at least one of the plurality of subsea adjustable speed drives, providing at least one capacitor bank electrically connected to at least one of the plurality of subsea adjustable speed drives, and delivering power to at least one subsea direct electrical heating cable electrically connected to at least one of the plurality of subsea adjustable speed drives in series with the at least one capacitor bank and in contact with the at least one subsea flowline.

In another aspect, a system is provided for integrating power distribution for subsea boosting and direct electrical heating of at least one subsea flowline. The system includes a subsea power cable located in a subsea environment electrically connected to at least one power generator at a topsides location, a subsea switchgear module receiving power from the subsea power cable, a plurality of subsea adjustable speed drives electrically connected to the subsea switchgear module, at least one pump motor and subsea pressure boosting pump electrically connected to at least one of the plurality of subsea adjustable speed drives, at least one capacitor bank electrically connected to at least one of the plurality of subsea adjustable speed drives and in contact with at least one flowline in the subsea flowline system, and at least one subsea direct electrical heating cable electrically connected to at least one of the plurality of subsea adjustable speed drives in series with the at least one capacitor bank and in contact with the at least one subsea flowline.

DESCRIPTION OF THE DRAWINGS

These and other objects, features and advantages of the present invention will become better understood with reference to the following description, appended claims and accompanying drawings. The drawings are not considered limiting of the scope of the appended claims. The elements shown in the drawings are not necessarily to scale. Reference numerals designate like or corresponding, but not necessarily identical, elements.

DETAILED DESCRIPTION

Figure 1:
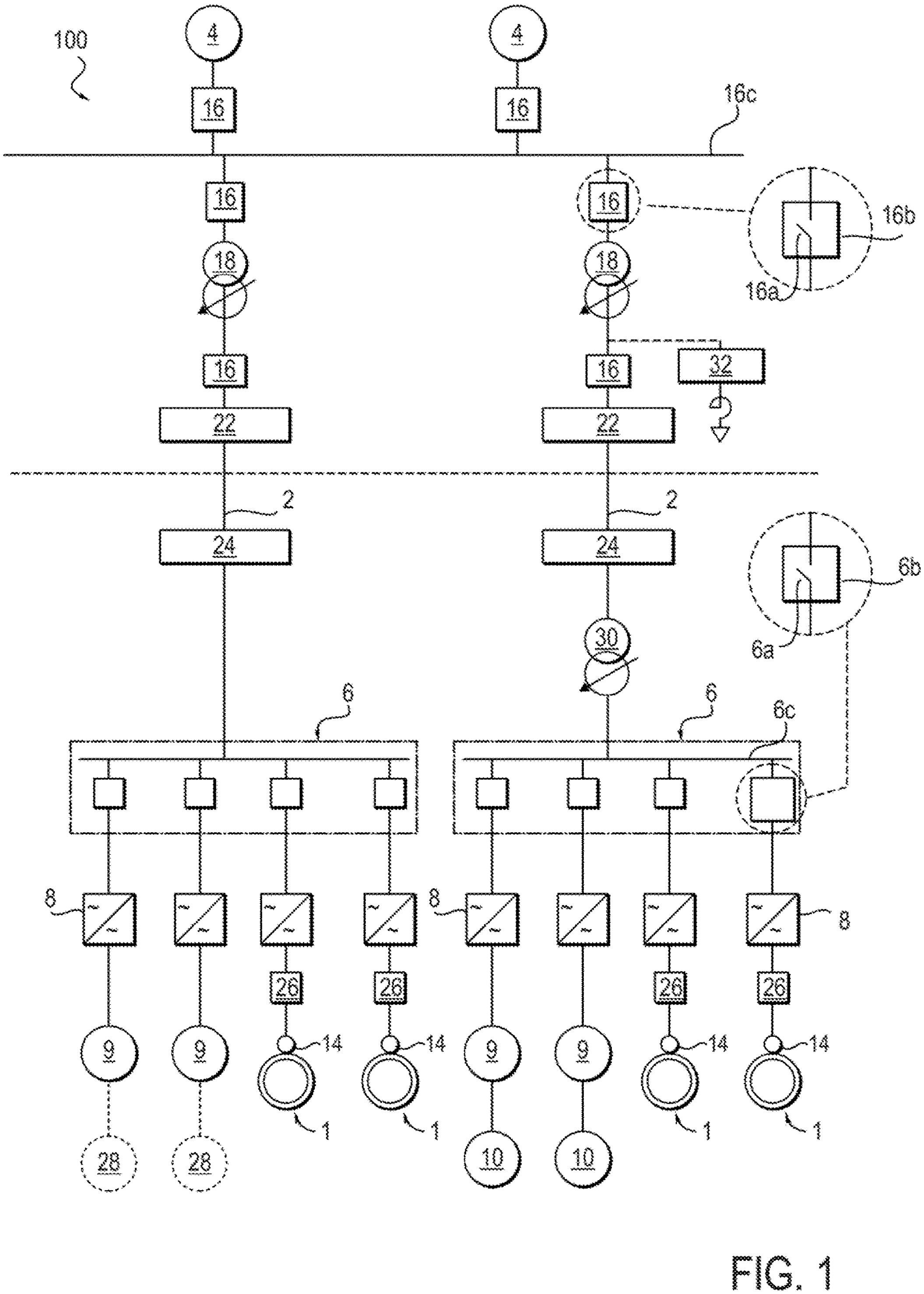
FIG. 1 is a schematic diagram illustrating components of a system according to one exemplary embodiment.

With reference to FIG. 1, embodiments of a system 100 for integrating power distribution for subsea boosting and direct electrical heating of at least one subsea flowline 1 in a subsea flowline system will now be described. The subsea flowline(s) 1 can vary in length from 2 to 200 km per flowline.

A subsea power cable 2 located in a subsea environment is electrically connected to and receives power from at least one power generator 4 at a topsides location. The power cable 2 includes conductive elements and can be rated for high-voltage, e.g., up to 132 kV.

Subsea switchgear is provided to control, protect and isolate subsea electrical equipment. At least one subsea switchgear module 6, also referred to herein interchangeably as switchgear, can include one or more circuit breakers **6*a* within a switchgear housing 6*b* and a bus 6*c* to distribute power among the circuit breakers 6*a*. The subsea switchgear module 6 receives power from the subsea power cable 2**. A nonlimiting example of subsea switchgear equipment can be found in U.S. Patent Application Publication No. 2009/0284901A1.

A plurality of subsea adjustable speed drives 8, also referred to herein interchangeably as adjustable speed drives (ASD), are electrically connected to and receive power via the at least one subsea switchgear module 6. Subsea ASD is electrical equipment used to control the speed of at least one subsea pump motor 9. The subsea pump motor 9 is electrically connected to at least one of the plurality of subsea adjustable speed drives 8 such that the subsea pump motor 9 receives power from the adjustable speed drives 8.

At least one subsea pressure boosting pump 10, also referred to herein interchangeably as a boosting pump, is electrically connected to and driven by the subsea pump motor 9. The boosting pump 10 is energized by the subsea pump motor 9.

Figure 3:
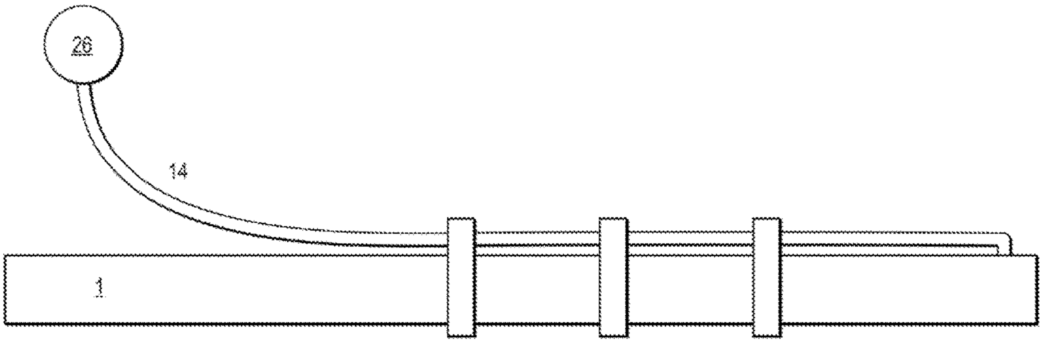
FIG. 3 is a schematic diagram illustrating a DEH cable in a system according to another exemplary embodiment.

At least one capacitor bank 26 is electrically connected to at least one of the subsea adjustable speed drives 8. At least one subsea direct electrical heating cable 14, also referred to herein interchangeably as DEH cable, is electrically connected to at least one of the subsea adjustable speed drives 8 in series with the at least one capacitor bank 26 and in contact with the at least one subsea flowline 1. The DEH cable 14 can be in contact with the flowline 1 along the length of the flowline in the form of a piggyback cable that is attached to the flowline by any suitable means. For instance, the piggyback cable 14 can be strapped to the flowline 1. FIG. 3 is a simplified diagram illustrating a DEH cable 14 along the flowline 1. The DEH cable 14 conducts current along the length of the flowline 1. The DEH cable 14 can be surrounded by wet insulation. In one embodiment, two subsea direct electrical heating cables 14 are in contact with the subsea flowline 1. Each of the two DEH cables 14 are electrically connected to at least one of the subsea adjustable speed drives 8 in series with the at least one capacitor bank 26. In one embodiment, prior to starting flow in the subsea flowline 1, the at least one subsea direct electrical heating cable 14 is energized by energizing at least one subsea adjustable speed drive 8 such that the subsea flowline(s) 1 is heated by the subsea direct electrical heating cable(s) 14. Upon the flowline(s) 1 reaching a desired temperature, flow is started in the subsea flowline(s) 1.

In embodiments of methods using system 100, power distribution for subsea boosting is integrated with power distribution or direct electrical heating of the subsea flowline(s) 1. Power is delivered through the subsea power cable 2 from the power generator(s) 4 to the subsea switchgear module 6. In turn, power is delivered to the subsea adjustable speed drives 8. Power is then delivered in parallel from the adjustable speed drives 8 to each of the subsea pump motors 9/subsea pressure boosting pumps 10 and the capacitor bank(s) 26. The DEH cable(s) 14 which are in contact with the subsea flowline(s) 1 are connected in series with the capacitor bank(s) 26. The flow rate of produced hydrocarbons in the subsea flowline(s) 1 can be adjusted by adjusting a power load and output frequency from at least one of the subsea adjustable speed drives 8 to the at least one subsea pump motor 9 to adjust a flow rate of produced hydrocarbons in the at least one subsea flowline 1.

In one embodiment, the system 100 further includes a topsides switchgear module 16 located at the topsides location. The topsides switchgear module 16 includes one or more circuit breakers 16*a* within a switchgear housing 16*b* and a bus 16*c* to distribute power among the circuit breakers 16*a*. The topsides switchgear module 16 receives power from the at least one power generator 4. The subsea power cable 2 is electrically connected to and receives power via the topsides switchgear module 16. In one embodiment, the system 100 further includes a topside transformer 18 at the topsides location electrically connected to the topsides switchgear module 16 for adjusting a voltage received from the topside switchgear module 16. The topside transformer 18 can be used to increase the voltage over long-distance cables. The subsea power cable 2 is electrically connected and receives power from the topside transformer 18.

The system 100 may optionally further include a shunt reactor 32 for stabilizing voltage to allow power transmission in the subsea power cable 2 over a length of the at least one subsea flowline 1. The shunt reactor 32 is a compact absorber of reactive power useful for compensating charging current in a long high-voltage transmission line, i.e. a long distance tieback. The shunt reactor 32 thus increases the energy efficiency of the system.

The system may optionally include a topside umbilical termination assembly (also referred to as a TUTA) 22 electrically connected to the topside transformer 18 for interface to the subsea power cable 2.

The system 100 may optionally include a subsea umbilical termination assembly (also referred to as a UTA) 24 located in a subsea environment and electrically connected to the subsea power cable 2 for interface to the subsea switchgear 6.

The system 100 may optionally include a subsea transformer 30 electrically connecting the subsea power cable 2 and the subsea switchgear 6. The optional subsea transformer 30 may alternatively connect the subsea umbilical termination assembly 24 and the subsea switchgear 6. The subsea transformer 30 can be particularly useful in systems having long distance tiebacks.

Figure 2:
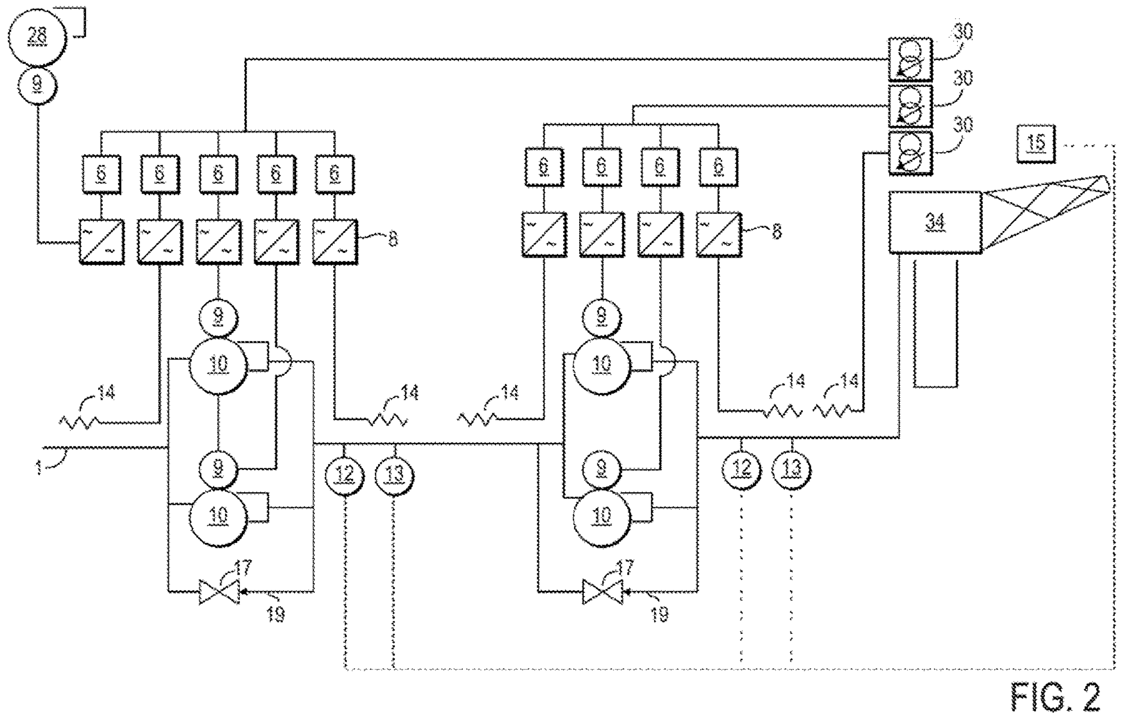
FIG. 2 is a schematic diagram illustrating components of a system according to another exemplary embodiment.

In one embodiment, shown in FIG. 2, the system 100 may optionally include at least one pressure sensor 12 for monitoring pressure in at least one location in the at least one subsea flowline 1. The system may optionally further include at least one process controller 15 in communication with the at least one pressure sensor 12 for determining whether the pressure is above or below a desired value. If the pressure is either above or below the desired value, the process controller 15 can send a signal to at least one of the subsea adjustable speed drives 8 to adjust a power load and output frequency from the at least one of the subsea adjustable speed drives 8 to the at least one subsea pump motor 9, e.g., to increase the power to the subsea pressure boosting pump 10.

In one embodiment, the system 100 may optionally include at least one temperature sensor 13 for monitoring temperature in at least one location in the subsea flowline 1. The system may optionally further include at least one process controller 15 in communication with the temperature sensor(s) 13 for determining whether the temperature is below a desired value. If the temperature is below the desired value, the process controller 15 sends a signal to at least one of the subsea adjustable speed drives 8 to adjust a power load and output frequency from at least one of the subsea adjustable speed drives 8 to the subsea direct electrical heating cable 14, e.g., to increase the power to the subsea direct electrical heating cable 14 to increase the temperature in the at least one subsea flowline 1.

In one embodiment, if the temperature is below the desired value, the process controller 15 can send a signal to a recycle valve 17 for controlling flow in a recycle loop 19 at the subsea pressure boosting pump 10 to increase the amount of recycled produced hydrocarbon circulating in the recycle loop 19. A portion of the energy required to maintain the recycle flow of the recycled produced hydrocarbon circulating in the recycle loop 19 is converted to heat such that the heat increases the temperature of the produced hydrocarbons leaving the subsea pressure boosting pump 10. In one embodiment, after a period of time following the starting of flow in the subsea flowline 1, the power load from the subsea switchgear 6 to the subsea direct electrical heating cable 14 can be adjusted. The amount of recycled produced hydrocarbon circulating in the recycle loop 19 can also be adjusted. In this way, the desired temperature can be maintained.

In some embodiments, referring again to FIG. 1, the system further includes a subsea water pump 28 for injecting water into a subsurface formation (not shown) via an injection well (not shown). The subsea water pump 28 can be connected to the subsea pump motor 9. By adjusting a power load and output frequency from the subsea adjustable speed drives 8 to the subsea pump motor 9, a flow of water into the subsurface formation (not shown) can be adjusted as desired.

Embodiments of the present disclosure provide increased operational flexibility and decreased life cycle cost of oil field development and production. In embodiments having two subsea pressure boosting pumps 10 (and subsea pump motors 9) at each power station, in addition to providing redundancy for pressure boosting, the two subsea pressure boosting pumps 10 contribute to flowline heating when the pumps 10 are operated in recycle mode. By operating in recycle mode, heat is generated in the flowline 1, thus reducing DEH power usage once the flow line 1 has reached steady state operation.

The subsea DEH cable 14 will be energized at peak capacity prior to startup of flow in the system but it will be ramped down or turned off prior to the subsea pump 10 start up. After the subsea pumps have been started, the flowline heating contribution from operating the pumps 10 in recycle mode further reduces the power requirements of the DEH 14 during steady state operation. The periods of peak power utilization of both the DEH and subsea boosting systems are offset relative to each other. This allows the subsea power distribution system sizing to be optimized to capture significant capital savings as compared with a power distribution system having dedicated power umbilicals for each of the DEH and subsea boosting systems.

Adding the subsea DEH load to subsea power distribution makes the overall solution cost advantageous as compared to a typical tieback configuration. This has a significant cost reduction impact to long distance subsea tiebacks on a wider distribution of assets. The impact may be even greater for brownfield applications.

It should be noted that only the components relevant to the disclosure are shown in the figures, and that many other components normally part of a subsea flowline and oil and gas production system, including additional accessories used in subsea boosting and direct electrical heating systems, are not shown for simplicity.

For the purposes of this specification and appended claims, unless otherwise indicated, all numbers expressing quantities, percentages or proportions, and other numerical values used in the specification and claims are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent.

Unless otherwise specified, the recitation of a genus of elements, materials or other components, from which an individual component or mixture of components can be selected, is intended to include all possible sub-generic combinations of the listed components and mixtures thereof. Also, "comprise," "include" and its variants, are intended to be non-limiting, such that recitation of items in a list is not to the exclusion of other like items that may also be useful in the materials, compositions, methods and systems of this invention.

This written description uses examples to disclose the invention, including the best mode, and also to enable any person skilled in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

From the above description, those skilled in the art will perceive improvements, changes and modifications, which are intended to be covered by the appended claims.

What is claimed is:

1. A system for integrating power distribution for subsea boosting and direct electrical heating of at least one subsea flowline, comprising:

a. a subsea power cable located in a subsea environment electrically connected to at least one power generator at a topsides location;

b. a subsea switchgear module comprising one or more circuit breakers within a switchgear housing wherein the subsea switchgear module receives power from the subsea power cable;

c. a plurality of subsea adjustable speed drives electrically connected to the subsea switchgear module;

d. at least one pump motor electrically connected to at least one of the plurality of subsea adjustable speed drives;

e. at least one subsea pressure boosting pump electrically connected to the at least one pump motor;

f. at least one capacitor bank electrically connected to at least one of the plurality of subsea adjustable speed drives;

g. at least one subsea direct electrical heating cable electrically connected to at least one of the plurality of subsea adjustable speed drives in series with the at least one capacitor bank and in contact with the at least one subsea flowline;

h. at least one temperature sensor for monitoring a temperature in at least one location in the at least one subsea flowline; and i. at least one process controller in communication with the at least one temperature sensor for determining whether the temperature in the at least one location is below a desired value; and if the temperature in the at least one location is below the desired value, for sending a signal to a recycle valve for controlling flow in a recycle loop at the at least one subsea pressure boosting pump to increase an amount of recycled produced hydrocarbon circulating in the recycle loop; wherein a portion of an enemy required to maintain a recycle flow of the recycled produced hydrocarbon circulating in the recycle loop is converted to heat such that the heat increases a temperature of produced hydrocarbons leaving the at least one subsea pressure boosting pump.

2. The system of claim 1, further comprising a topsides switchgear module located at the topsides location comprising a circuit breaker within a switchgear housing and receiving power from the at least one power generator, wherein the subsea power cable is electrically connected to the topsides switchgear module.

3. The system of claim 2, further comprising a topside transformer at the topsides location electrically connected to the topsides switchgear module for adjusting a voltage received from the topside switchgear module, wherein the subsea power cable is electrically connected to the topside transformer.

4. The system of claim 3, further comprising a shunt reactor for stabilizing voltage to allow power transmission in the subsea power cable over a length of the at least one subsea flowline.

5. The system of claim 3, further comprising a topside umbilical termination assembly electrically connected to the topside transformer for interface to the subsea power cable.

6. The system of claim 1, further comprising a subsea umbilical termination assembly located in the subsea environment and electrically connected to the subsea power cable for interface to the subsea switchgear module.

7. The system of claim 1, further comprising a subsea transformer electrically connecting the subsea power cable and the subsea switchgear module.

8. The system of claim 6, further comprising a subsea transformer electrically connecting the subsea umbilical termination assembly and the subsea switchgear module.

9. The system of claim 1, further comprising at least one pressure sensor for monitoring pressure in at least one location in the at least one subsea flowline.

10. The system of claim 9, further comprising the at least one process controller in communication with the at least one pressure sensor for determining whether the pressure in the at least one location is above or below a desired value; and if the pressure in the at least one location is above or below the desired value, for sending a signal to at least one of the plurality of subsea adjustable speed drives to adjust a power load and output frequency from the at least one of the plurality of subsea adjustable speed drives to the at least one pump motor.

11. The system of claim 1, further comprising the at least one process controller in communication with the at least one temperature sensor for determining if the temperature in the at least one location is below a desired value and if the temperature in the at least one location is below the desired value, for sending a signal to at least one of the plurality of subsea adjustable speed drives to increase a power load from the subsea switchgear module to the at least one subsea direct electrical heating cable.

12. The system of claim 1, wherein two subsea direct electrical heating cables are electrically connected to the at least one of the plurality of subsea adjustable speed drives in series with the at least one capacitor bank and in contact with the at least one subsea flowline in the system.

13. The system of claim 1, further comprising a subsea water pump electrically connected to the at least one pump motor for injecting water into a subsurface formation via an injection well.

14. A method for integrating power distribution for subsea boosting and direct electrical heating of at least one subsea flowline, comprising:

a. delivering power through a subsea power cable located in a subsea environment from at least one power generator at a topsides location to a subsea switchgear module comprising one or more circuit breakers within a switchgear housing;

b. delivering power to a plurality of subsea adjustable speed drives electrically connected to the subsea switchgear module;

c. delivering power to at least one pump motor electrically connected to at least one of the plurality of subsea adjustable speed drives;

d. delivering power to at least one subsea pressure boosting pump electrically connected to the at least one pump motor;

e. providing at least one capacitor bank electrically connected to at least one of the plurality of subsea adjustable speed drives;

f. delivering power to at least one subsea direct electrical heating cable electrically connected to at least one of the plurality of subsea adjustable speed drives in series with the at least one capacitor bank and in contact with the at least one subsea flowline;

g. monitoring a temperature in at least one location in the at least one subsea flowline using at least one temperature sensor;

h. determining whether the temperature in the at least one location is below a desired temperature using at least one process controller in communication with the at least one temperature sensor; and i. if the temperature in the at least one location is below the desired temperature, sending a signal to a recycle valve for controlling flow in a recycle loop at the subsea pressure boosting pump to increase an amount of recycled produced hydrocarbon circulating in the recycle loop; wherein a portion of an enemy required to maintain a recycle flow of the recycled produced hydrocarbon circulating in the recycle loop is converted to heat such that the heat increases a temperature of produced hydrocarbons leaving the subsea pressure boosting pump.

15. The method of claim 14, further comprising providing a subsea transformer electrically connected between the subsea power cable and the subsea switchgear module.

16. The method of claim 14, further comprising providing a subsea umbilical termination assembly located in the subsea environment and electrically connected to the subsea power cable for interface to the subsea switchgear module.

17. The method of claim 16, further comprising providing a subsea transformer electrically connected between the subsea umbilical termination assembly and the subsea switchgear module.

18. The method of claim 14, wherein, prior to starting flow in the at least one subsea flowline, the at least one subsea direct electrical heating cable is energized by energizing at least one of the plurality of subsea adjustable speed drives electrically connected to the at least one subsea direct electrical heating cable such that the at least one subsea flowline is heated by the at least one subsea direct electrical heating cable.

19. The method of claim 18, further comprising, upon the at least one subsea flow line reaching a desired temperature, starting flow in the at least one subsea flowline.

20. The method of claim 14, further comprising adjusting a power load and output frequency from at least one of the plurality of subsea adjustable speed drives to the at least one pump motor to adjust a flow rate of produced hydrocarbons in the at least one subsea flowline.

21. The method of claim 14, further comprising monitoring a pressure in at least one location in the at least one subsea flowline and increasing power to the at least one pump motor and the at least one subsea pressure boosting pump in response to a monitored pressure above or below a desired pressure.

22. The method of claim 14, further comprising monitoring the temperature in the at least one location in the at least one subsea flowline and increasing power to the at least one subsea direct electrical heating cable in response to the monitored temperature falling below a desired temperature.

23. The method of claim 14, further comprising, after a period of time following the starting of flow in the at least one subsea flowline, adjusting a power load from the subsea switchgear module to the at least one subsea direct electrical heating cable and adjusting the amount of recycled produced hydrocarbon circulating in the recycle loop to maintain the desired temperature.

24. The method of claim 14, further comprising stabilizing voltage to allow power transmission in the subsea power cable over a length of the at least one subsea flowline using a shunt reactor.

25. The method of claim 14, further comprising injecting water into a subsurface formation via an injection well using a subsea water pump; wherein the subsea water pump is connected to the at least one pump motor such that by adjusting a power load and output frequency from at least one of the plurality of subsea adjustable speed drives to the at least one pump motor a flow rate of water into the subsurface formation is adjusted.

* * * * *